(12) United States Patent
Caggiano

(10) Patent No.: US 7,308,798 B2
(45) Date of Patent: Dec. 18, 2007

(54) DEHUMIDIFICATION SYSTEM

(75) Inventor: Mario Caggiano, Montreal (CA)

(73) Assignee: Munters Inc., Mississauga, Ontario (CA), part interest ( * ) Notice: Subject to any disclaimer, the term of this patent is extended or adjusted under 35 U.S.C. 154(b) by 239 days.

(21) Appl. No.: 11/226,269

(22) Filed: Sep. 15, 2005

(65) Prior Publication Data

US 2007/0056307 A1    Mar. 15, 2007

(51) Int. Cl.
*F25D 13/06* (2006.01)
*F25D 23/00* (2006.01)

(52) U.S. Cl. ............................................. 62/63; 62/271

(58) Field of Classification Search ................... 62/92, 62/93, 94, 271, 186, 406, 412; 165/8; 96/143, 96/146
See application file for complete search history.

(56) References Cited

U.S. PATENT DOCUMENTS

| | | | | |
|---|---|---|---|---|
| 3,844,737 | A * | 10/1974 | Macriss et al. ................. | 95/93 |
| 4,134,743 | A * | 1/1979 | Macriss et al. ................ | 95/113 |
| 4,948,392 | A * | 8/1990 | Rush ............................ | 95/113 |
| 5,659,974 | A * | 8/1997 | Graeff .......................... | 34/378 |
| 5,667,560 | A * | 9/1997 | Dunne .......................... | 95/113 |
| 6,029,462 | A * | 2/2000 | Denniston ...................... | 62/94 |
| 6,767,391 | B2 * | 7/2004 | Tanaka et al. ................. | 96/115 |
| 6,918,263 | B2 * | 7/2005 | Lee et al. ...................... | 62/271 |
| 7,097,925 | B2 * | 8/2006 | Keefer ............................ | 429/9 |
| 7,166,149 | B2 * | 1/2007 | Dunne et al. .................. | 95/113 |
| 2002/0142208 | A1 * | 10/2002 | Keefer et al. .................. | 429/34 |
| 2003/0143448 | A1 * | 7/2003 | Keefer .......................... | 429/26 |

FOREIGN PATENT DOCUMENTS

WO    WO 96/41107    * 12/1996

* cited by examiner

*Primary Examiner*—Mohammad M. Ali
(74) *Attorney, Agent, or Firm*—Merchant & Gould P.C.

(57) ABSTRACT

The present invention relates to dehumidification equipment and more particularly, to a dehumidification system and method for use in hazardous locations. In particular, there is provided a desiccant wheel assembly for use in a dehumidification system. The desiccant wheel assembly includes a cabinet and a desiccant wheel rotatively mounted within the cabinet. The desiccant wheel has a core impregnated with a desiccant material and an electrically conductive outer shell surrounding the core. Means are provided for driving rotation of the desiccant wheel within the cabinet. The desiccant wheel assembly further includes a static control device connected to a ground and associated with the desiccant wheel for discouraging the build-up of electrostatic charges on the desiccant wheel during rotation thereof. A dehumidification system comprising such a desiccant wheel assembly is also described along with a method for dehumidifying air in an enclosed space using a desiccant wheel dehumidification system.

50 Claims, 12 Drawing Sheets

DEHUMIDIFICATION SYSTEM

FIELD OF THE INVENTION

The present invention relates to dehumidification equipment and more particularly, to a dehumidification method and apparatus for use in hazardous locations.

BACKGROUND OF THE INVENTION

Humidity control is a primary concern in many industries. Accordingly, over the years, various techniques have been developed to address these concerns. One such technique to control humidity combines cooling and condensation principles to remove humidity from air. The air in an enclosed space is cooled until it reaches a temperature below its dew point temperature at which time the moisture in the air condenses on the nearest surface. Conventional cooling-based dehumidification systems typically include a cooling coil, a condensing coil and a compressor.

While these types of systems are capable of extracting moisture from the air, it should be noted that they are primarily designed for cooling air. Nonetheless, the use of cooling-based dehumidification systems in industrial facilities and installations remains relatively widespread. Some cooling-based dehumidification systems have even been used on work sites located in generally hazardous environments where significant explosion or ignition hazards tend to exist. A readily apparent advantage associated with these cooling-based dehumidification systems resides in the fact that these systems do not generate high temperature air streams which could otherwise ignite flammable vapours or gases in the ambient air. The use of such systems however has had mixed results. While these systems have tended to be effective at removing moisture from the air in regions where the ambient temperature is generally warm and the humidity is relatively high, they have tended not to perform well in regions where the climate tends to be colder. In particular, cooling-based dehumidification systems tend to become inefficient at removing moisture from the air when the dew point of the air approaches 0° C. because at that temperature the moisture freezes on the condensing coil. Accordingly, cooling-based dehumidification systems have been found to be ill-suited for use in hazardous environments located in cold climates.

Another known humidity control technique relies on differences in vapour pressure to remove water vapour from air. When air is humid it has a relatively high water vapor pressure. In contrast, a dry desiccant surface tends to have a low water vapour pressure. When the moist air comes in contact with the desiccant surface, the water molecules will move from the humid air to the desiccant surface in an effort to equalize the differential pressure. In the result, the humid air will be dried. Since these systems do not involve any liquid condensate, they can continue to remove moisture efficiently even when the dew point of the air is below freezing. In fact, the performance of such desiccant-based dehumidification systems tends to improve in colder temperatures. It will thus be appreciated that such systems do not suffer from the same drawback traditionally associated with cooling-based dehumidification systems.

Desiccant-type dehumidification systems typically employ a rotating desiccant wheel whose core is impregnated with desiccant material. The desiccant wheel includes a process section and a regeneration section. In operation, an air stream from the enclosed space flows through the process section in one direction, while simultaneously another, heated air stream through the regeneration section in an opposite direction, all the while the desiccant wheel rotates slowly about its longitudinal axis. As the air flows through the process section, the desiccant material in the core extracts moisture from the air. The thus treated air is returned to the enclosed space in a dehumidified state. The desiccant material is regenerated by the heated air stream which flows through the reactivation section of the desiccant wheel.

While such systems tend perform well in colder climates, conventional desiccant-type dehumidification systems have tended not to be employed in hazardous environments. This is because proper functioning of a conventional desiccant wheel requires the use of a heated air stream and a thermal energy source for regeneration (usually electricity). Both of these requirements tend to create significant explosion and ignition risks in a hazardous environment. Moreover, the risk of explosion or ignition is further compounded by the fact that rotation of the wheel and the drying action of the desiccant tend to promote the generation of significant static electrical charges. The build-up of these static electrical charges can result in electrostatic discharge causing sparking. In a hazardous location, sparking can ignite flammable or combustible vapours in the ambient air.

Accordingly, there is a need for a desiccant-based dehumidification system that is versatile and that may be safely deployed in hazardous environments while minimizing the risks of explosion and/or ignition.

SUMMARY OF THE INVENTION

According to a broad aspect of an embodiment of the present invention, there is provided a system for dehumidifying air in an enclosed space. The dehumidification system has a desiccant wheel assembly that includes a cabinet and a desiccant wheel rotatively mounted within the cabinet. The desiccant wheel has a core impregnated with a desiccant material and an electrically conductive outer shell surrounding the core. The desiccant wheel also has a process section and a reactivation or regeneration section defined in its core. The desiccant wheel assembly further includes means for driving rotation of the desiccant wheel within the cabinet and a static control device associated with the desiccant wheel and connected to a ground, for discouraging build-up of electrostatic charges on the desiccant wheel during rotation thereof. The dehumidification system has first blower means for drawing a supply air stream from the enclosed space and urging the supply air stream to flow through the process section of the desiccant wheel wherein moisture in the supply air stream is removed by the desiccant material. A process air outlet is located downstream of the process section of the desiccant wheel for exhausting the supply air stream into the enclosed space. The dehumidification system is also provided with: a reactivation system for heating a reactivation air stream; second blower means for drawing the reactivation air stream from outside the enclosed space through the reactivation system and urging the reactivation air stream to flow through the reactivation section of the desiccant wheel wherein moisture retained in the desiccant material is released into the reactivation air stream; and a reactivation air outlet located downstream of the reactivation section of the desiccant wheel for exhausting the reactivation air stream outside the enclosed space.

According to another broad aspect of an embodiment of the present invention, there is provided a desiccant wheel assembly for use in a dehumidification system. The desiccant wheel assembly includes a cabinet and a desiccant wheel rotatively mounted within the cabinet. The desiccant wheel has a core impregnated with a desiccant material and an electrically conductive outer shell surrounding the core. Means are provided for driving rotation of the desiccant wheel within the cabinet. The desiccant wheel assembly further includes a static control device connected to a ground and associated with the desiccant wheel for discouraging the build-up of electrostatic charges on the desiccant wheel during rotation thereof.

According to yet another broad aspect of an embodiment of the present invention, there is provided a method for dehumidifying air in an enclosed space using a desiccant wheel dehumidification system. The method includes: providing a rotatable desiccant wheel having a core impregnated with a desiccant material and an electrically conductive outer shell surrounding the core, the core of the desiccant wheel having a process section and a reactivation section defined therein; providing a static control device connected to a ground and associated with the desiccant wheel; driving the desiccant wheel to rotate; urging the static control device to contact the desiccant wheel to thereby discourage the build-up of electrostatic charges on the desiccant wheel during rotation thereof; drawing a supply air stream from the enclosed space and urging the supply air stream to flow through the process section wherein moisture in the supply air stream is removed by the desiccant material in the core; exhausting the thus dehumidified supply air stream into the enclosed space; and regenerating the desiccant material in the core.

BRIEF DESCRIPTION OF THE DRAWINGS

The embodiments of the present invention shall be more clearly understood with reference to the following detailed description of the embodiments of the invention taken in conjunction with the accompanying drawings, in which.

DETAILED DESCRIPTION OF EMBODIMENTS OF THE INVENTION

Figure 1:
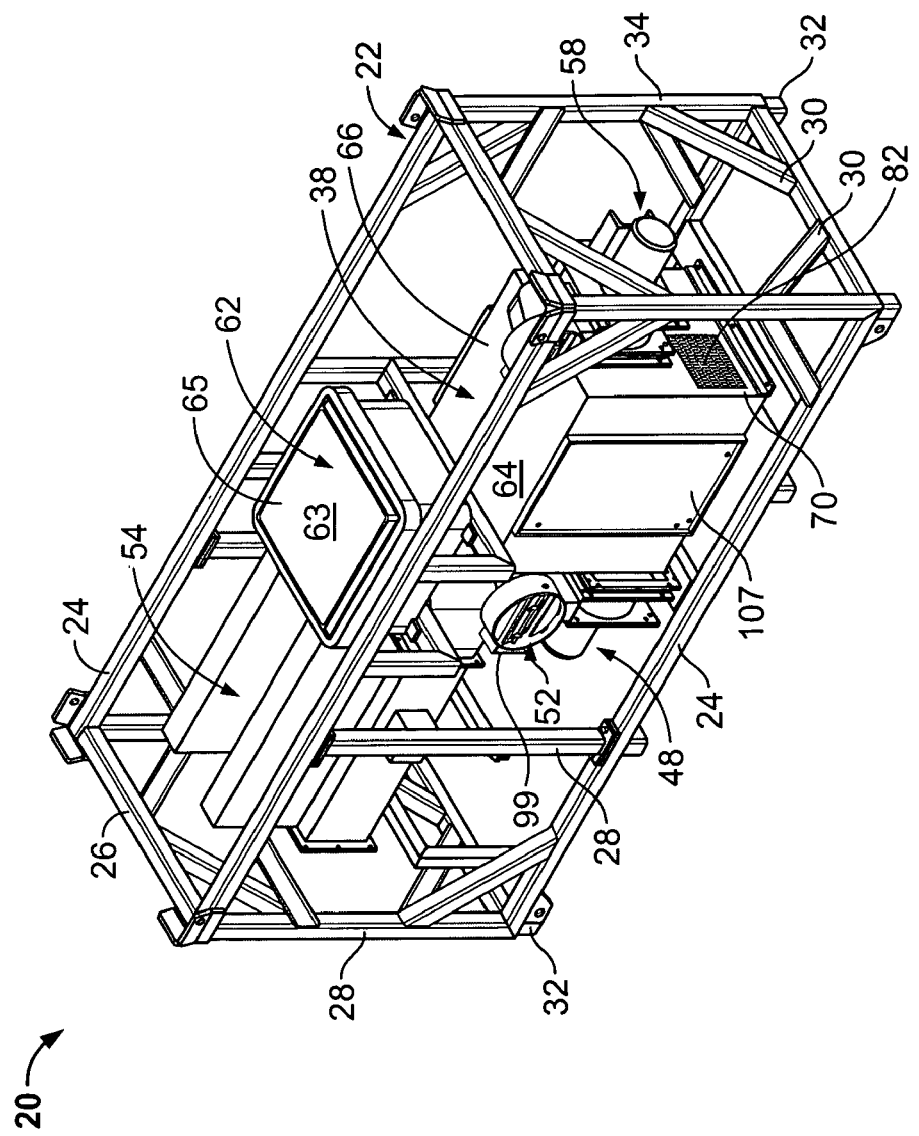
FIG. 1 is a schematic perspective view of a dehumidification system according to a preferred embodiment of the invention.

The description which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts are marked throughout the specification and the drawings with the same respective reference numerals.

With regard to nomenclature, the term "explosion-proof" as it is used throughout the specification in connection with the dehumidification system described herein or any electrical component, element, part, module, or motor thereof, means that the enclosure thereof is capable of withstanding the pressure of an explosive mixture exploding inside the enclosure without rupture and capable of preventing the propagation of an explosion inside the enclosure to the atmosphere surrounding the enclosure.

Referring to FIGS. 1, 2, 3 and 4, there is shown a dehumidification system designated generally with reference numeral 20. As will be explained in greater detail below, the dehumidification system 20 is operable to remove moisture from air in an enclosed space (not shown). The dehumidification system 20 may be installed within the enclosed space or with appropriate modifications to ductwork, may be mounted externally of the enclosed space, either indoors or outdoors. In an exemplary application, the enclosed space may be located in a hazardous environment, for instance, a location classified as Class I, Zone 2, as defined in the 2002 edition of the Canadian Electrical Code, Part I, Section 18 entitled "Hazardous Locations" published by the Canadian Standards Association, Toronto Ontario; the disclosure of which is hereby incorporated by reference. In such a location, flammable gas or vapour may be present in the air in quantities sufficient to produce an explosive or ignitable mixture. However, while this hazard does not normally exist, it may occur under abnormal conditions. Examples of such hazardous locations include off-shore drilling platforms, oil refineries, petrochemical plants, chemical production facilities and nuclear power plants. As will be explained below in greater detail, the dehumidification system 20 tends to be well-suited for safe deployment in such hazardous locations.

The dehumidification system 20 is supported on a rectangular, box-like, rigid structural steel frame 22 constructed from a plurality of structural members in the nature of top and bottom longitudinal beams 24, top and bottom transverse beams 26, vertical posts 28, and diagonal brace members 30. The frame 22 includes a plurality of feet 32—each foot 32 located at a respective corner 34 of the frame 22—for placement on a structural support surface such as a roof or a floor. Spaced vertically from the feet 32 and extending between the longitudinal beams 24 of the frame 22, is a pair of spaced-apart cross-members 36 upon which the dehumidification system 20 is mounted. As shown in FIGS. 1 to 4, the frame 22 is open to thereby facilitate access to the dehumidification system 20 for routine maintenance or repairs. However, it will be understood that in an alternative embodiment, the frame could be constructed with outer panels or walls forming an enclosed structure for housing the dehumidification system 20. Such an enclosed structure would provide enhanced environmental protection for the dehumidification system 20.

As will be appreciated, when supported on frame 22, the dehumidification system 20 benefits from enhanced portability. It can be transported with ease to a work site for permanent or temporary deployment. For instance, in an exemplary application, the dehumidification system 20 can be deployed on a work site at a hazardous location where the resurfacing of metal surfaces is being undertaken. Humidity control on these work sites is of primary concern because the resurfacing activities involve blasting a metal surface to remove the old protective coating thereby exposing the underlying metal surface to the ambient air. If the level of humidity is left unchecked the exposed metal surface may be susceptible to corrosion before the new protective coating can be applied. Deployment of the dehumidification system 20 on the work site tends to substantially mitigate the risk of corrosion. Once the resurfacing activities have been completed in one area of the installation or facility, the dehumidification system 20 can be moved to the next worksite.

Figure 4:
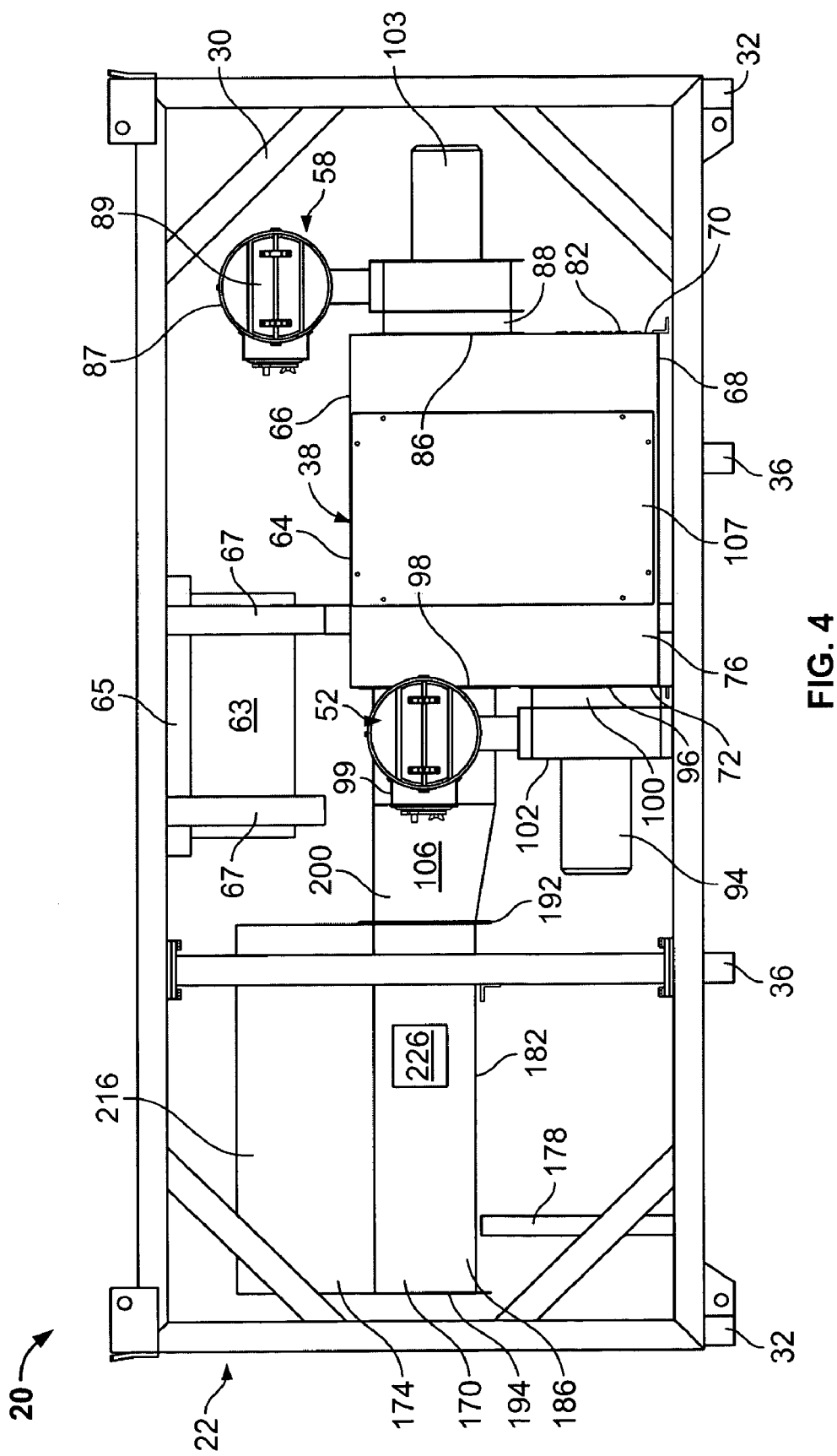
FIG. 4 is a schematic side elevation view of the dehumidification system shown in FIG. 1.
Figure 6:
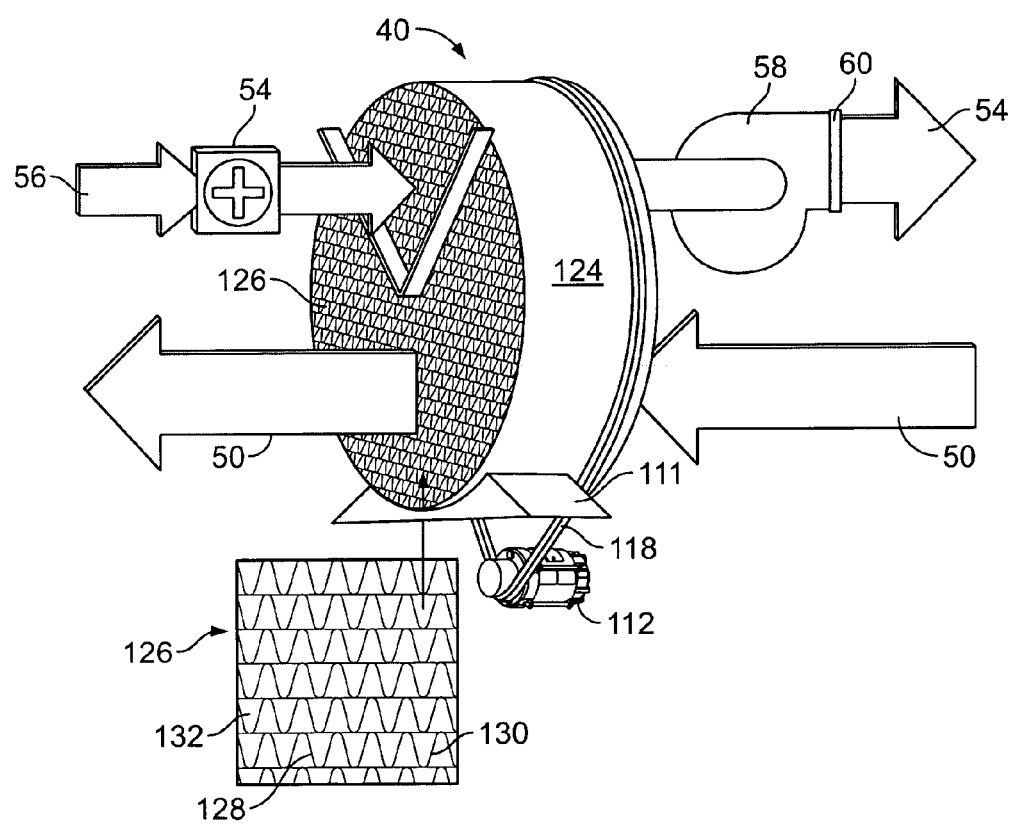
FIG. 6 is a schematic cross-sectional view of the desiccant wheel shown in FIG. 5 depicting typical air flows through the desiccant wheel during operation of the dehumidification system with the electric drive motor for driving the desiccant wheel shown not to scale.
Figure 7:
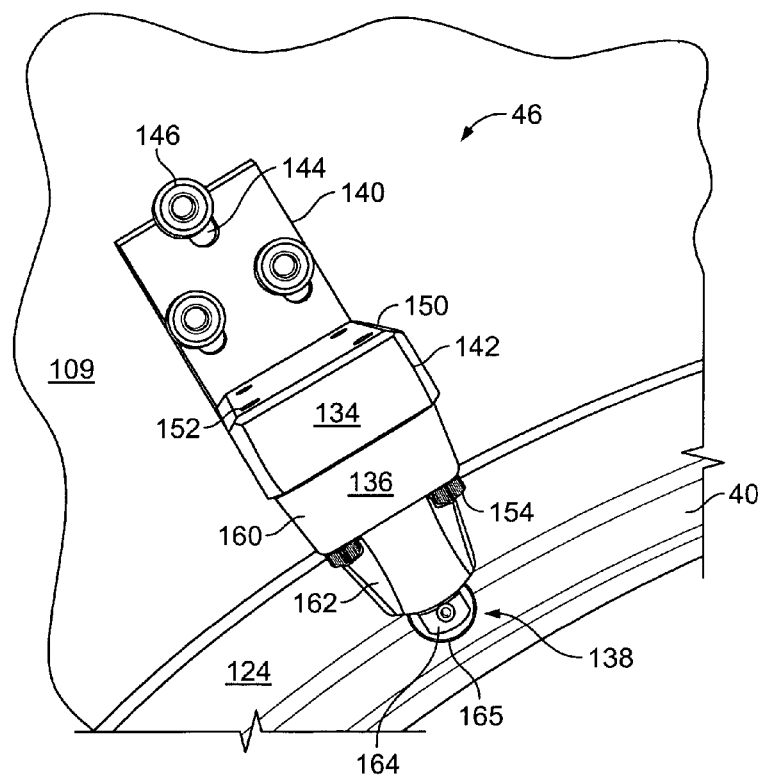
FIG. 7 is an enlarged, perspective view of the static control device shown in FIG. 5.
Figure 8:
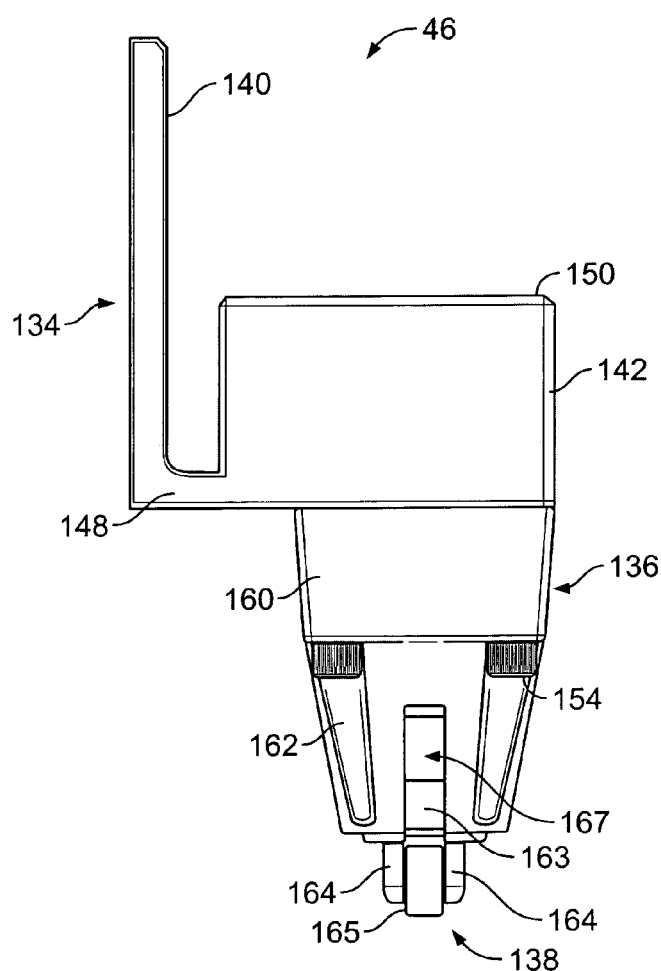
FIG. 8 is an enlarged, isolated side elevation view of the static control device shown in FIG. 7.
Figure 9:
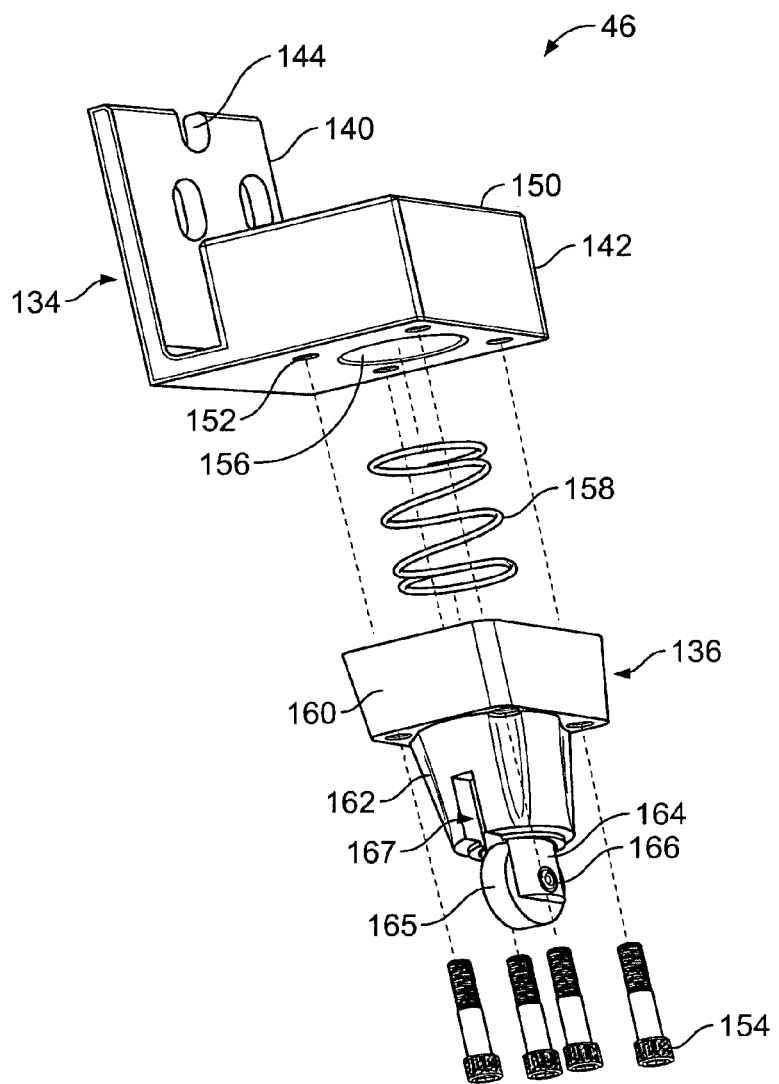
FIG. 9 is an exploded, isolated view of the static control device shown in FIG. 7.

With reference to FIGS. 4 and 6, generally speaking, the dehumidification system 20 includes: a desiccant wheel dehumidification assembly 38 having a desiccant wheel 40 with a process section 42 and a reactivation or regeneration section 44 and a static control device 46 associated with the desiccant wheel 40 to discourage the build-up of an electrostatic charge thereon; first blower means 48 for drawing a process air stream 50 from the enclosed space and urging it to flow through the process section 42 of the desiccant wheel 40 to thereby remove moisture from the process air stream 50; a process air outlet 52 located downstream of the process section 42 of the desiccant wheel 40 for exhausting the treated (dehumidified) process air stream 50 into the enclosed space; reactivation system 54 for heating a reactivation air stream 56 drawn from outside the enclosed space; second blower means 58 for drawing the reactivation air stream 56 from outside the enclosed space through the reactivation system 54 and urging it to flow through the reactivation section 44 of the desiccant wheel 40 to thereby cause the moisture trapped in the reactivation section 44 to be released therefrom into the reactivation air stream 56; and a reactivation air outlet 60 located downstream of the reactivation section 44 of the desiccant wheel 40 for exhausting the moist reactivation air stream 56 outside the enclosed space.

An electrical control system 62 governs actuation of the blower means 48 and 58, the reactivation system 54 and the desiccant wheel assembly 38. The control system 62 is housed in a generally square, protective enclosure 63 having a hinged lid 65. The enclosure 63 is supported above the desiccant wheel assembly 38 by a pair of brackets 67 that extend between and depend from top longitudinal beam 24. Both the control system 62 and the protective enclosure 63 are designed to be explosion-proof. Preferably, the protective enclosure 63 and lid 65 are made of copper-free aluminum.

Referring to FIGS. 1 to 4, the desiccant wheel dehumidification assembly 38 is housed in a box-like housing or cabinet 64 supported on cross-members 36 of frame 22. In the preferred embodiment, the cabinet 64 is constructed from welded aluminum coated with durable, air-dry polyurethane paint. The cabinet 64 includes top and bottom walls 66 and 68, front and rear, spaced, walls 70 and 72, respectively, and a pair of opposed side walls 74 and 76.

Figure 2:
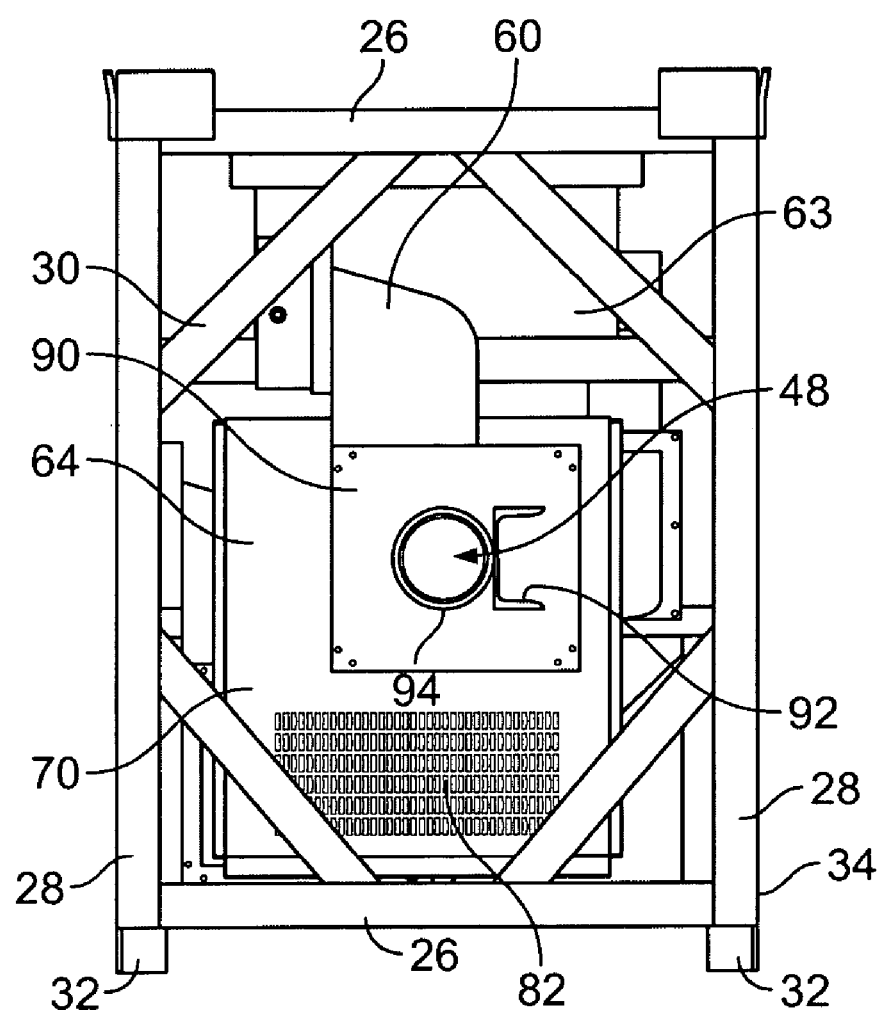
FIG. 2 is a schematic end view of the dehumidification system shown in FIG. 1.

As shown in FIGS. 2 and 4, adjacent the bottom wall 68, the front wall 70 has a first cutout 80 to allow process air stream 50 to flow into the process section 42 of the desiccant wheel 40 from process air inlet 82. Mounted over process air inlet 82, is a filter 84 for removing fairly large-sized airborne particles from the process air stream 50 prior to the process air stream 50 entering the process section 40 of the desiccant wheel. Operation of the filter 84 tends to prevent the particles from accumulating within the process section 42 and clogging same, and generally interfering with the proper functioning of the desiccant wheel 40. In the preferred embodiment, the filter 84 is a metallic mesh filter; it is washable and it may be easily removed for cleaning.

The front wall 70 has a second cutout 86 located above the first cutout 80, adjacent the top wall 66. The second cutout 86 permits reactivation air stream 56 to flow out from the reactivation section 44 of the desiccant wheel 40 and into the reactivation air outlet 60 for discharge into the atmosphere. Mounted over the reactivation air outlet 60 is a manually operable, damper assembly 87 including at least one rotatable louver 89 for selectively restricting air flow out of the reactivation outlet 60.

The second cutout 86 is connected to the reactivation air outlet 60 via ducting 88. At its end, ducting 88 is capped by a square end plate 90. A C-shaped structural channel member 92 is mounted to extend substantially perpendicular to end plate 90 in a generally cantilevered fashion, with one end thereof welded to the end plate 90. The first blower means 48 is secured to, and supported by, the end plate 90 and the back of channel member 92.

In the preferred embodiment, the first blower means 48 includes a suction blower 94 driven by an electric motor (not shown). The electric motor is totally enclosed and designed to be explosion-proof. However, it will be appreciated that the motor driving suction blower 94 need not be an electric motor. In alternative embodiments, pneumatically driven or hydraulically driven motors could be employed.

Rear wall 72 includes first and second cutouts 96 and 98, respectively. First cutout 96 is located adjacent the bottom wall 68 and allows process air stream 50 emerging from the process section 42 of the desiccant wheel 40 to flow into the process air outlet 52 for discharge into the enclosed space. A manually operable, damper assembly 99 identical to damper assembly 87 is mounted at the mouth of the process air outlet 52 and selectively restricts air flow into the enclosed space.

The first cutout 96 is connected to the process air outlet 52 via ducting 100. Ducting 100 is similar to ducting 88 described above. A square end plate 102 caps the distal end of ducting 100. Mounted in cantilevered fashion to end plate 102, is a C-shaped structural channel member (not shown) similar to channel member 92. The second blower means 58 is secured to, and supported by, the end plate 102 and the back of channel member 104. Second blower means 58 is identical to first blower means 48 in that it includes a suction blower 103 driven by an electric motor (not shown) that it is designed to be explosion-proof.

The second cutout 98 is located above first cutout 88 and is adapted to receive the stem portion 105 of Y-shaped, bifurcated conduit 106 (best shown in FIG. 3) that is connected to the reactivation system 54.

As shown in FIGS. 1 and 4, each of the side walls 74 and 76 has an outer access panel 107 which may be removed to permit easy access to the desiccant wheel assembly 38 for inspection or servicing without having to disconnect any ducting or electrical wiring. Optionally, the outer access panels 107 may be provided with a small window (not shown) defined therein to allow visual inspection of the desiccant wheel assembly 38. A pair of gauges 108 (only one of which can be seen in FIG. 5) is mounted within the cabinet 64 and visible from the side wall 74. One gauge 108 displays air flow measurements relating to the process air stream 50 while the other displays air flow measurements relating to the reactivation air stream 56.

Figure 5:
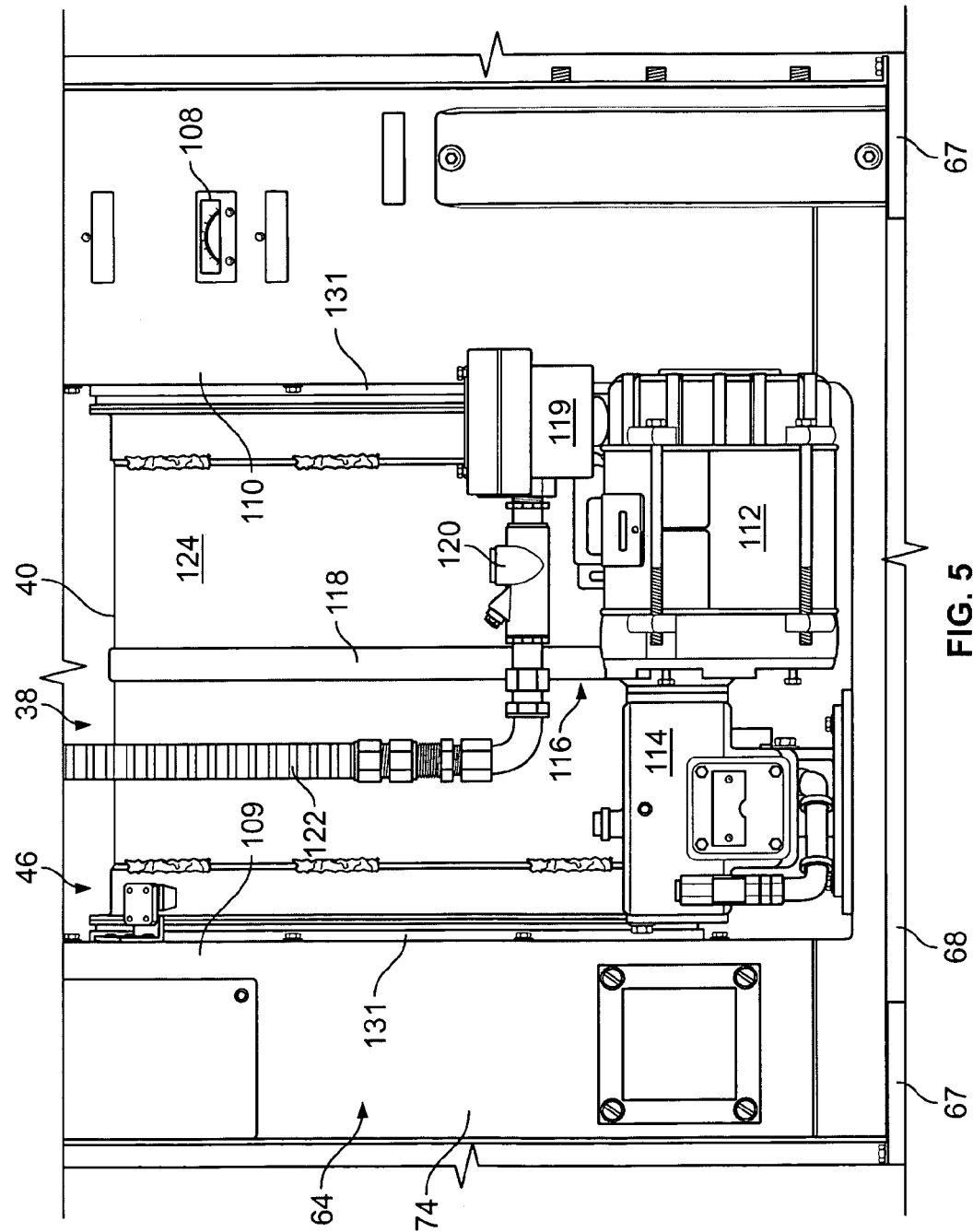
FIG. 5 is a side elevation view of the desiccant wheel cabinet shown in FIG. 4 with outer panels thereof removed to reveal the desiccant wheel assembly.

With reference to FIGS. 5 and 6, the desiccant wheel assembly 38 is mounted within the cabinet 64 between two interior walls 109 and 110 thereof. The desiccant wheel assembly 38 includes desiccant wheel 40 supported on a set of caster assemblies 111 (conceptually shown on FIG. 6). The caster assemblies 111 have bearing surfaces (not shown) upon which the desiccant wheel rests during rotation.

An electric drive motor 112 is provided for driving rotation of the desiccant wheel 40 along its longitudinal axis. To mitigate the explosion hazard resulting from sparking of the brush contacts within the motor, the electric drive motor 112 is totally enclosed and designed to be explosion-proof. In some applications, the electric drive motor may include an internal fan for cooling the motor. Alternatively, the electric drive motor may be outfitted with an air purging system that builds up a positive pressure of air to reduce the concentration of any flammable gas or vapour to an acceptable level within the motor such that explosive gases or vapours may be prevented from reaching electrical ignition sources. While in the preferred embodiment, an electric drive motor is used, it will be appreciated that in other embodiments pneumatically driven or hydraulically driven motors could be used to similar advantage.

The electric drive motor 112 is operatively connected to the desiccant wheel 40 by way of a gear box 114 and a self-tensioning drive belt arrangement 116 that includes drive belt 118. The provision of gear box 114 enables the delivered speed to be stepped down thereby allowing the desiccant wheel 40 to be rotatively driven at relatively low revolutions. In the preferred embodiment, the desiccant wheel 40 is driven to rotate at a rate of approximately 6 to 12 revolutions per hour. The electric drive motor 112 is connected to a junction box 119 that is designed to be explosion-proof. An electrical conduit system 120 comprising electrical lines (not shown) enclosed in sealed metal tubing 122, is tied into the junction box 119. The conduit system 120 serves to connect the electric drive motor 112 to the control system 62.

As best shown in FIG. 6, the desiccant wheel 40 includes an electrically conductive tubular body, casing or outer shell 124 and a monolithic, relatively lightweight, core 126. In the preferred embodiment, the outer shell 124 is made of aluminum. However, it will be appreciated that in alternative embodiments, other electrically conductive metals or alloys could also be used in the fabrication of the outer shell 124.

The core 126 has a matrix of honeycomb-like structures 128 made up of walls 130. The walls 130 define generally uniform channels or passageways 132 extending substantially parallel to the axis of the air flow (process air stream 50 and reactivation air stream 56). The walls 130 are fabricated from a non-metallic, inorganic, non-corrosive, inert composite. The walls 130 are preferably made of extruded fiberglass paper fibers measuring at least 5 microns in diameter, and are impregnated with a solid, non-granular desiccant material in a known manner. The desiccant material is evenly dispersed throughout the core 126. The following materials have been found to be suitable for use as a desiccant material in the desiccant wheel 40: lithium chloride; silica gel, including titanium silica gel; and molecular sieve. Other materials that tend not to channel, cake or fracture due to repeated temperature and moisture cycling, may also be used as desiccant materials.

When dry and cool, the desiccant material extracts moisture from air (sorption) because it has a low vapour pressure as compared to humid air. Conversely, the desiccant material releases moisture into the air (desorption) when it becomes wet and hot because under those conditions the desiccant material tends to have a high vapour pressure. The desiccant wheel 40 is considered to be an active desiccant wheel. As will be explained in greater detail below, the dehumidification system 20 uses heated reactivation air stream 56 within the reactivation section 44 of the desiccant wheel 40 to bring about release of the moisture from the desiccant material. During operation of the dehumidification system 20, the desiccant material will continuously alternate between high and low vapour pressures to alternately, adsorb moisture (from process air stream 50) and release moisture (into reactivation air stream 56).

Because moisture removal in the desiccant wheel 40 occurs in the vapour phase, there is no liquid condensate. As a result, the dehumidification system 20 can continue to remove moisture from the process air stream 50 even when the dew point of the process air stream 50 is below freezing. It will thus be understood that, in contrast to conventional cooling-based dehumidification systems, the dehumidification system 20 tends to be very versatile and particularly well-suited for deployment in regions having cold climates.

In the preferred embodiment, the desiccant wheel 40 employed is the HoneyCombe® Desiccant Wheel manufactured by Munters Corporation of Fort Myers, Fla., U.S.A.

A generally V-shaped, partition member 133 mounted within the cabinet 64 segregates a pie-shaped portion of the core 126 from the remaining portion thereof to define the reactivation section 44 of the desiccant wheel 40. The remaining portion of the core 126 defines the process section 42 of the desiccant wheel 40. The reactivation portion of the core 126 may occupy between about one quarter to one third of the surface area of the desiccant wheel 40. Preferably, the reactivation portion occupies one quarter of the surface area of the desiccant wheel 40.

During operation of the dehumidification system 20, the portions of the core 126 which define the process and reactivation sections 42 and 44 are constantly changing as a result of rotation of the desiccant wheel 40. Accordingly, that the portion of the core 126 that is exposed to the process air stream 50 defines the process section 42. Likewise, the portion of the core 126 that is exposed to the reactivation air stream 56 defines the reactivation section 44.

Within the core 126 the process air stream 50 is drawn through the process section 42 toward the process air outlet 52, simultaneously, within the reactivation section 44, the reactivation air stream 56 is traveling in a direction opposite to that of process air stream 50, toward the reactivation air outlet 60. It will thus be understood that as it rotates, the desiccant wheel 40 accommodates two separate, counterflowing or opposing air streams within its sections 42 and 44. Contact pressure seals 131 mounted about the fore and aft rims of the outer shell 124 and the edges of partition member 133 are provided to separate the process air stream 50 from the reactivation air stream 56 and eliminate detrimental leakage of air or moisture within the cabinet 64.

During operation of the dehumidification system 20, the removal of moisture from the air process stream 50 by the desiccant wheel 40 creates low relative humidity conditions within the cabinet 64 that tend to promote the generation of significant static electrical charges. The build-up of these static electrical charges and the subsequent discharge thereof can lead to sparks that can ignite flammable or combustible vapours in the ambient air, thereby creating a serious risk of explosion or ignition. To discourage potentially hazardous electrostatic discharge, the humidification system 20 is provided with static control device 46. Static control device 46 provides a path to ground for continually draining static charges from the desiccant wheel. While in the preferred embodiment, the frame 22 serves as ground, it will be appreciated that in other embodiments, an alternative ground including an electrical ground could be employed.

Referring to FIGS. 5, 7, 8 and 9, the static control device 46 includes a generally L-shaped, bracket 134 for attachment to the cabinet 64, a mounting block assembly 136 depending from the bracket 134 and a grounding member 138 carried on the mounting block assembly 136. The bracket 134 includes a first leg 140 integrally joined to a second leg 142. The first leg 140 has three oblong slots 144 for receiving fasteners 146 therethrough. Fasteners 146 securely anchor the first leg 140 to the interior wall 109 of the cabinet 64. The provision of slots 144 in the first leg 140 tends to facilitate adjustment of the position of the static control device 46 relative to the cabinet 64 and the desiccant wheel 40. The second leg 142 has a proximal portion 148 connected to the first leg 140, and terminates in a raised distal portion 150 which when seen in top plan view is generally square-shaped. At each corner thereof, the raised distal portion 150 has an aperture 152 that is adapted to receive a fastener 154. The fastener 154 secures the second leg 142 to the mounting block assembly 136. The distal portion 150 has a blind bore 156 formed on the underside thereof that is sized to accommodate a spring member 158 of mounting block assembly 136.

The mounting block assembly 136 has a hollow base 160 that is integrally formed with a frusto-conical portion 162. The portion 162 has a bore (not shown) sized to receive therethrough the spring member 158 and a generally tubular member 163. The tubular member 163 has a pair of spaced apart arms 164 for supporting the grounding member 138. In the preferred embodiment, the grounding member 138 takes the form of a wheel or disc 165. The disc 165 is rotatively mounted on an axle 166 extending between the arms 164 of the tubular member 163. Frusto-conical portion 162 is provided with a transverse rebate 167 extending from its tip partway down to provide sufficient clearance to allow the disc 165 to protrude therethrough. Spring member 158 urges the tubular member 163 to bear against the inside of the frusto-conical portion 162. When the static control device 46 is operatively connected to cabinet 64, the spring member is slightly compressed such that the disc 165 is biased against the outer shell 124 of the desiccant wheel 40. Spring-loading the disc 165 in this manner ensures that the disc 165 maintains continuous contact with the outer shell of thereby reducing the instances of static charge build-up in the desiccant wheel. If desired, the bracket 134 could be modified to accommodate a tension adjustment mechanism to permit selective adjustment of the biasing of the disc 165 against the outer shell 124.

In the preferred embodiment, the bracket member 134 and the mounting block assembly 136 are made of aluminum, while the grounding member 138 is made of steel. Alternatively, other electrically conductive metals or alloys could be used to fabricate the bracket member, mounting block assembly and grounding member.

In alternative embodiments, the grounding member 138 could be configured differently. For instance, the grounding member could include a brush member with metallic bristles for engaging one of the outer shell of the desiccant wheel, and one of the walls of the cabinet.

In the preferred embodiment, the static control device 46 is mounted to the interior wall 109, such that its position remains fixed relative to cabinet 64. It will be appreciated that the static control device could also be mounted to one of the other walls of the cabinet, for instance, top wall 66, bottom wall 68, or one of side walls 76 or 78.

In an alternative embodiment, with the appropriate modifications, the static control device could be mounted onto the outer surface of outer shell 124 for rotation about the axis of rotation of the desiccant wheel 40. In such a case, during operation of the dehumidification system 20 the position of the static control device relative to the cabinet 64 would vary continuously. In any event, as with the preferred static control device 46, the alternative static control device would preferably be provided with biasing means to allow the grounding member to maintain constant or at least frequent contact with the cabinet in order to ensure proper grounding of the desiccant wheel assembly.

Additional modifications are also possible. For instance, in an alternative embodiment, the static control device could be designed for location at the fore and aft rims of the outer shell 124. More specifically, with appropriate modifications to the contact pressure seals 131, a set of ball bearings or the like, fabricated from an electrically conductive metal or alloy, could be disposed between the fore rim of outer shell 124 and the interior wall 109 of the cabinet 64, and between the aft rim and the interior wall 110 of cabinet 64. In such an embodiment, the ball bearings would serve as the grounding member.

In other alternative embodiments, the static control device could be positioned underneath the desiccant wheel. For instance, the static control device could include a brush member mounted to the bottom wall 68 of the desiccant wheel cabinet 64 with its bristles extending generally upwardly toward the outer shell 124. During rotation of the desiccant wheel, the bristles of the brush could serve as the grounding member. The bristles could brush against the outer shell thereby continually draining static charges from the desiccant wheel. Alternatively, such a brush member could be mounted to one of the other walls of the cabinet.

In another embodiment, the static control device could be incorporated into the caster assemblies supporting the desiccant wheel 40. In such an embodiment, at least a portion of the caster assemblies would define the static guard device. Moreover, each caster assembly could be fabricated from an electrically conductive metal or alloy and connected to a ground.

In still another embodiment, the grounding member could be an electrically conductive plate or flap hingedly mounted to one of the walls of the desiccant wheel cabinet, for instance, the bottom wall 66. The flap could be biased against the outer shell 124 of the desiccant wheel 40 by way of a spring member or the like. It will thus be appreciated that the static control device may take various forms.

The foregoing alternative static control devices have been described in connection with desiccant wheel assembly 38 that includes a desiccant wheel 40 supported on caster assemblies 111 and mounted between two interior walls 109 and 110 of the desiccant wheel cabinet 64. As will be appreciated by a person skilled in the art, there are alternate configurations of desiccant wheel assemblies that may be used in the dehumidification system. These desiccant wheel assemblies may require use of other static control devices. For instance, an alternate desiccant wheel assembly may have a desiccant wheel axially mounted about a central shaft, and a hub and bearing assembly. The desiccant wheel includes a core containing desiccant material surrounded by an electrically conductive outer shell. The desiccant wheel is driven to rotate about the shaft. In such a desiccant wheel assembly, the static control device could take the form of a rod, plate, or the like extending from the outer shell to the shaft. In this case, the shaft or the bearing assemblies would be connected to the ground.

Figure 3:
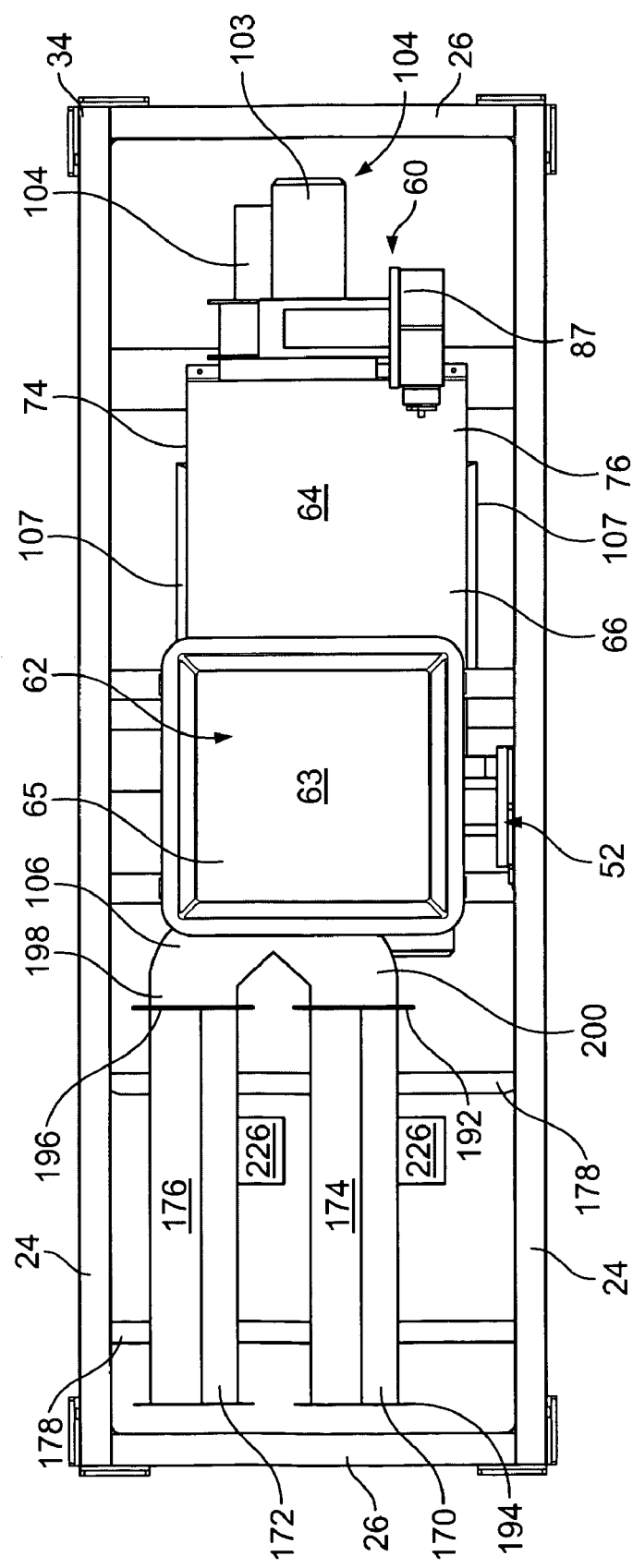
FIG. 3 is a schematic top plan view of the dehumidification system shown in FIG. 1.

With reference to FIGS. 1, 3, 4, 10, 11 and 12, the reactivation system 54 is now described in greater detail. The reactivation system 54 includes a pair of generally rectangular duct assemblies 170 and 172 and a corresponding pair of air heating modules in the nature of duct heaters 174 and 176. The duct assemblies 170 and 172 are supported by a structural bracket 178 extending from the frame 22. Each duct assembly 170, 172 includes a top wall 180, a bottom wall 182 and a pair of opposed side walls 184 and 186 which co-operate together to define an interior passage 188 through which the reactivation air stream 56 will be urged to flow. The top wall 180 includes a cutout 190 to permit a portion of the duct heater 174, 176 (as the case may be) to extend within the passage 188. Each duct assembly 170, 172 also has first and second ends 192 and 194, respectively. Each end 192, 194 has a flange 196 with a plurality of apertures to facilitate mounting of the duct assemblies. As best shown in FIG. 3, end 192 is connected to the branch 198, 200 (as the case may be) of the bifurcated conduit 106. A filter (not shown) similar to filter 84 described above, is mounted to the end 194 of the ducting assembly 170, 172.

In the preferred embodiment, the duct assemblies 170 and 172 are constructed from carbon steel and coated with a rust-resistant, grey epoxy paint on its outer surfaces, and a high-temperature aluminum on its interior surfaces.

Figure 10:
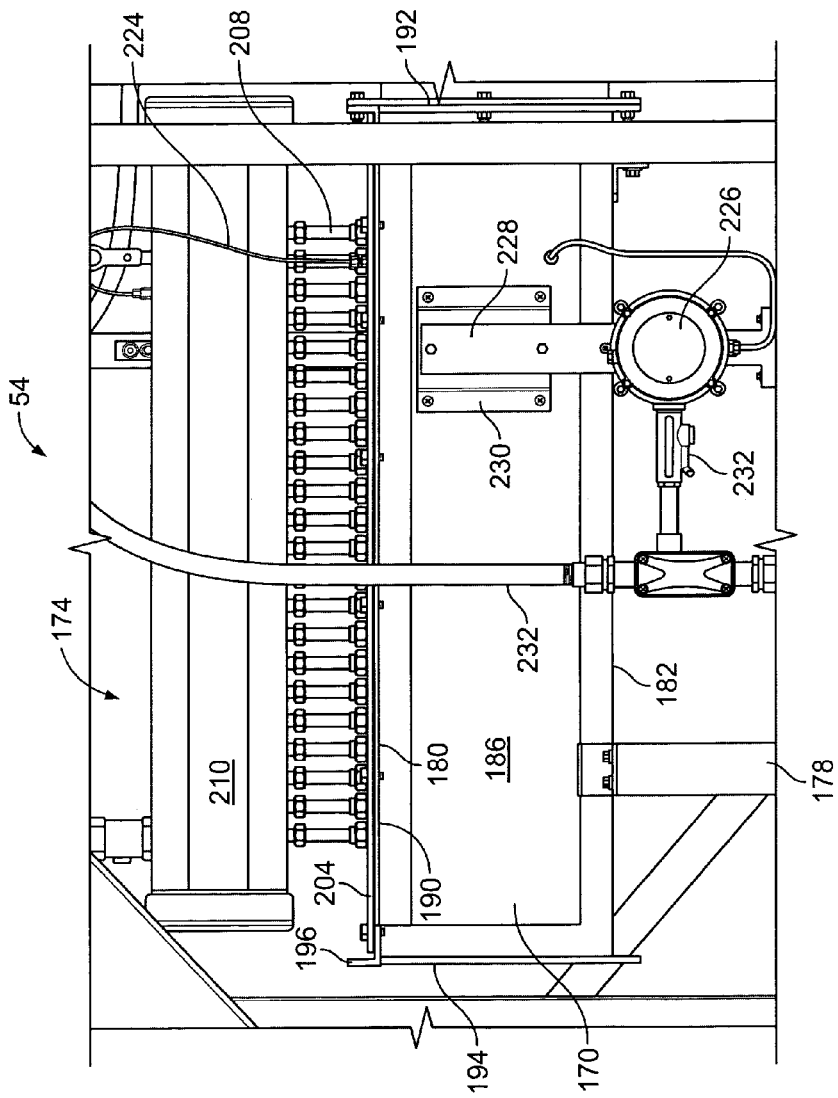
FIG. 10 is a side elevation view of the reactivation system shown in FIG. 3 with the outer panels of enclosures surrounding the duct heaters of the reactivation system removed for clarity.
Figure 11:
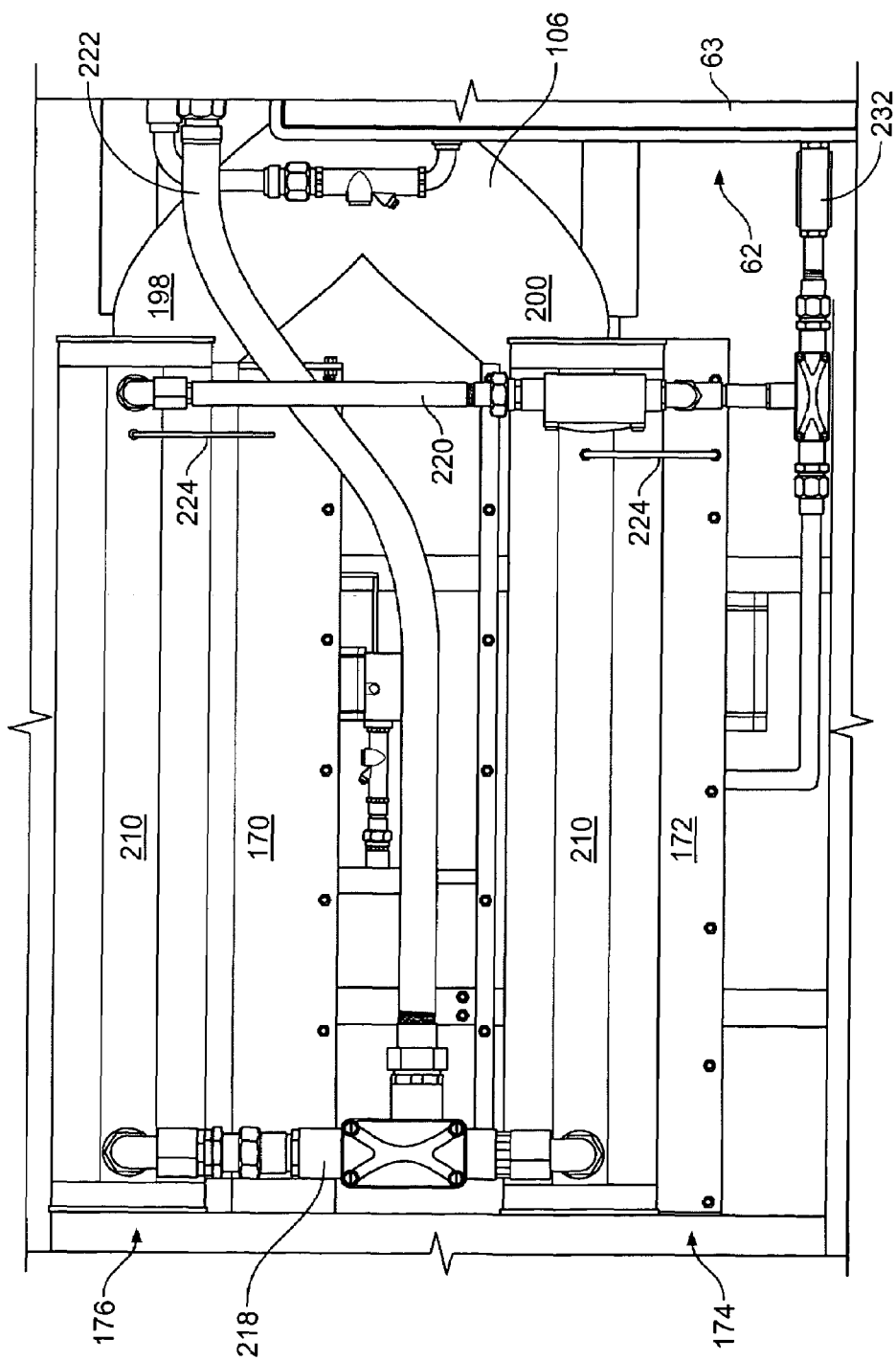
FIG. 11 is a top plan view of the reactivation system shown in FIG. 10.
Figure 12:
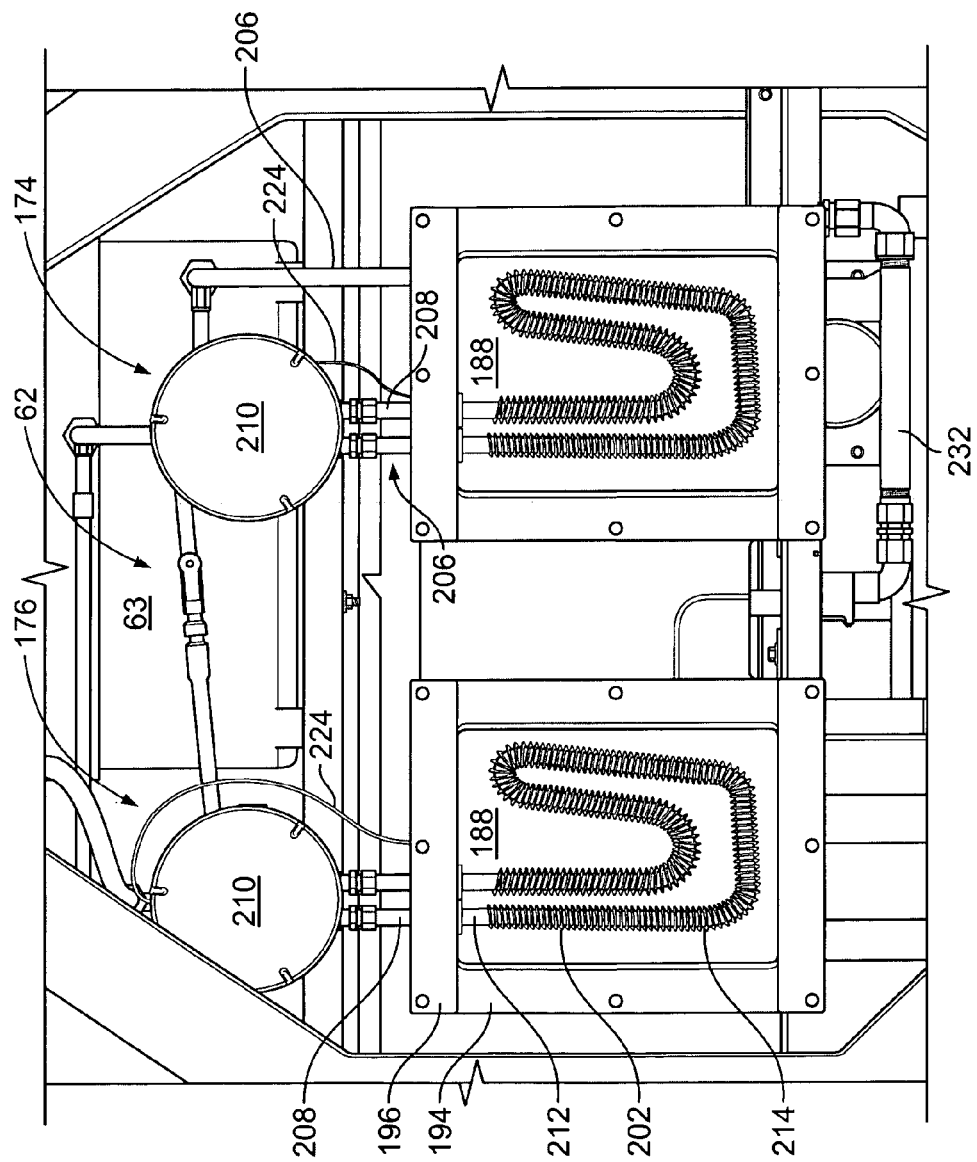
FIG. 12 is an end view of the reactivation system of FIG. 10.

In the preferred embodiment, the duct heaters 174 and 176 are electrical heaters and are designed to be explosion-proof. Duct heater 174 is generally similar to duct heater 176 such that with minor modifications, the description of the former shall suffice for the latter. Referring now specifically to FIGS. 10, 11 and 12, duct heater 174 has a plurality of spaced-apart heating elements 202 supported by a mounting plate 204. The mounting plate 204 is adapted to fit over the cutout 190 defined in top wall 180 of duct assembly 170, and is securely fastened to top wall 180. As best shown in FIG. 10, the heating elements 202 extend downwardly from the mounting plate 204 into the interior passage 188 of duct assembly 170. Outside the duct assembly 170, a plurality of pairs 206 of compression fittings 208 corresponding to the plurality of heating elements 202 stand proud of the mounting plate 204. Each compression fitting 208 of a respective pair 206 receives therethrough an end of a respective heating element 202 for electrical connection to a terminal block assembly (not shown) housed within a terminal enclosure 210 located above the duct assembly 170.

In the preferred embodiment, each heating element 202 includes a heavy walled carbon steel tubular sheath 212 with nickel plated finish on which is brazed a plurality of fins 214. The compression fittings 208 are preferably fabricated from nickel plated brass and are designed to be explosion-proof.

The terminal enclosure 210 has a generally tubular body fabricated from extruded copper-free aluminum. It is designed to be explosion-proof. In the preferred embodiment, the terminal enclosure used is manufactured by CCI Thermal Technologies Inc. of Edmonton, Alberta, Canada, and is described more fully in U.S. Pat. No. 5,798,910 issued to Holbeche et al., the disclosure of which is hereby incorporated herein. When the dehumidification system 20 is deployed on a work site, the terminal enclosure 210 is protected from the environment with a housing 216.

Actuation of the duct heaters 174 and 176 is governed by the control system 62. During operation of the dehumidification system 20, one duct heater 174 or 176 (as the case may be) is continuously actuated while the other duct heater's actuation will be modulated. More specifically, the control system 62 will be selectively actuate the other duct heater to maintain the reactivation air stream 56 exiting the reactivation air outlet 60 at a predetermined temperature. In the preferred embodiment, this temperature is 50° C.

Electrical connection of the duct heaters 174 and 176 to each other and to the control system 62 is achieved by way of several electrical conduit systems. As shown in FIG. 11, a pair of first and second reactivation electrical conduit systems 218 and 220 extends between the terminal enclosures 208 of duct heaters 174 and 176. First electrical conduit system 218 connects the respective terminal block assemblies of duct heaters 174 and 176 to each other, while the second electrical conduit system 220 connects their respective thermocouple terminal blocks. A third reactivation electrical conduit system 222 extending from the control system 62 is connected to the first electrical conduit system 218. Electrical conduits 218, 220 and 222 are generally similar to electrical conduit system 120 described above.

Each duct heater 174, 176 is further provided with temperature control means that includes at least one thermocouple 224, and an explosion-proof differential pressure switch 224 (best shown in FIG. 10). Thermocouple 224 extends from one of the heating elements 202, through the top plate 180, and into the terminal enclosure 210 for connection to a thermocouple terminal block (not shown). Differential pressure switch 226 is supported on an elongate bracket 228 that is fixedly attached to a plate 230. The plate 230 in turn is mounted to side wall 184, 186 (as the case may be). The pressure switch 226 of each duct heater is operatively connected to the other and to the control system 62 by way of an electrical conduit system 232 generally similar to electrical conduit system 120 described above.

All electrical conduits 120, 218, 220, 222 and 232 and all other wiring in the dehumidification system 20 are appropriate for use in hazardous environments.

While in the preferred embodiment, reactivation system 54 uses electrical energy to heat the reactivation air stream 54 (by way of electrically powered duct heaters 174 and 176), this need not be the case in every application. It will be understood that in alternative embodiments, electrical reactivation could be replaced with steam reactivation or gas fired (direct or indirect) reactivation to similar advantage. Heat generated from steam or gas could be used to heat the reactivation air stream.

Operation of the dehumidification system 20 will now be described in greater detail. When the dehumidification system 20 is deployed, the desiccant wheel 40 is driven to rotate and both suction blowers 94 are 103 actuated. Suction blower 94 draws moist process air stream 50 from the enclosed space through the process air inlet 82 defined in the desiccant wheel cabinet 64. The process air stream 50 flows through filter 84 and ducting 88 and into the process air section 42 of the desiccant wheel 40. As it passes through the process section 42, the process air stream 50 is stripped of its moisture by the desiccant material impregnated within the walls 130 of desiccant wheel core 126. By the time the process air stream 50 leaves the cabinet 64 its moisture content has been reduced to a predetermined level. The treated (dried) process air stream 50 is then evacuated through the process air outlet 52 and returned to the enclosed space.

Simultaneously, suction blower 105 draws reactivation air stream 56 from the atmosphere outside the enclosed space into the duct assemblies 170 and 172. Preferably, the flow rate of reactivation air stream 56 through duct assemblies 170 and 172 is maintained at, at least 15.6 m³/min. As the reactivation air stream 56 moves through the interior passages 188 its temperature increases as a result of heat transfer between the heating elements 202 of duct heaters 174 and 176 and the reactivation air stream 56. Typically, the temperature of the reactivation air stream 56 reaches between about 137° C. and 160° C. The thus heated reactivation air stream 56 flows through the bifurcated conduit 106 and into the reactivation section 44 of the desiccant wheel 40, where it serves to regenerate the portion of the desiccant wheel core 126 that was exposed to the moist process air stream 50 earlier. As it passes through the reactivation section 44, the reactivation air stream 50 heats the walls 130 of the desiccant wheel core 126, thereby causing the desiccant material to release the moisture into the reactivation air stream 50. The now moist reactivation air stream 56 leaves the cabinet 64 and is then evacuated through the reactivation air outlet 60 into the atmosphere outside the enclosed space. Care is taken to ensure that the temperature of the reactivation air stream 56 leaving the reactivation air outlet 60 does not exceed 50° C. Prior to re-entering the process section 42, the desiccant material is cooled in order to further reduce the vapour pressure of the desiccant material and enhance its moisture adsorbing properties. The slow rotation speed of the desiccant wheel 40 tends to promote cooling of the desiccant material.

Although the foregoing description and accompanying drawings relate to specific preferred embodiments of the present invention and specific methods of dehumidification as presently contemplated by the inventors, it will be understood that various changes, modifications and adaptations, may be made without departing from the spirit of the invention.

What is claimed:

1. A desiccant wheel assembly for use in a dehumidification system, the desiccant wheel assembly comprising:
    a cabinet;
    a desiccant wheel rotatively mounted within the cabinet, the desiccant wheel having a core impregnated with a desiccant material and an electrically conductive outer shell surrounding the core;
    means for driving rotation of the desiccant wheel within the cabinet; and
    a static control device connected to a ground and associated with the desiccant wheel for discouraging the build-up of electrostatic charges on the desiccant wheel during rotation thereof.

2. The desiccant wheel assembly of claim 1 wherein the core is fabricated from extruded paper fibers.

3. The desiccant wheel assembly of claim 2 wherein the extruded paper fibers measure at least 5 microns in diameter.

4. The desiccant wheel assembly of claim 1 wherein the desiccant material is a solid, non-granular desiccant material.

5. The desiccant wheel assembly of claim 4 wherein the desiccant material is selected from the group consisting of: (a) lithium chloride; (b) silica gel; and (c) molecular sieve.

6. The desiccant wheel assembly of claim 1 wherein the outer shell is made of aluminium.

7. The desiccant wheel assembly of claim 1 wherein the driving rotation means includes a motor designed to be explosion-proof.

8. The desiccant wheel assembly of claim 7 wherein the motor is selected from the group consisting of: (a) an electric motor; (b) a hydraulically-driven motor; and (c) a pneumatically-driven motor.

9. The desiccant wheel assembly of claim 1 wherein the static control device is connected to the outer shell of the desiccant wheel.

10. The desiccant wheel assembly of claim 9 wherein the static control device is fixed to one of the desiccant wheel and the cabinet.

11. The desiccant wheel assembly of claim 1 wherein the cabinet includes a plurality of walls defining a space for accommodating the desiccant wheel, the static control device being disposed within the space.

12. The desiccant wheel of claim 11 wherein:
    the plurality of walls includes a bottom wall and a pair of spaced apart, first and second walls extending upwardly from the bottom wall; and
    the desiccant wheel has an axis of rotation disposed longitudinally between the first and second walls.

13. The desiccant wheel assembly of claim 12 wherein the static control device is fixed to one of the plurality of walls of the cabinet.

14. The desiccant wheel assembly of claim 13 wherein the static control device is fixed to the first wall of the cabinet.

15. The desiccant wheel assembly of claim 14 wherein the static control device includes:
    a grounding member for engaging the outer shell of the desiccant wheel;
    a biasing member for biasing the grounding member against the outer shell; and
    a mounting block for carrying the grounding member.

16. The desiccant wheel assembly of claim 15 wherein the static control device further includes a bracket for attachment to the first wall of the cabinet, the bracket supporting the mounting block.

17. The desiccant wheel assembly of claim 16 wherein the bracket is L-shaped.

18. The desiccant wheel assembly of claim 17 wherein the bracket has a first leg secured to the first wall of the cabinet and a second leg supporting the mounting block.

19. The desiccant wheel assembly of claim 15 wherein the biasing member is a spring.

20. The desiccant wheel assembly of claim 15 wherein the grounding member is a disc.

21. The desiccant wheel assembly of claim 20 wherein the disc is axially mounted within the mounting block.

22. The desiccant wheel assembly of claim 12 wherein the static control device is urged to rotate about the axis of rotation during rotation of the desiccant wheel.

23. The desiccant wheel assembly of claim 22 wherein:
    the outer shell is a tubular body, the tubular body having an inner surface and an outer surface; and
    the static control device is mounted onto the outer surface of the outer shell.

24. The desiccant wheel assembly of claim 12 wherein:
the outer shell is a tubular body, the tubular body having fore and aft rims; and
the static control device is connected to the tubular body at one of the fore and aft rims.

25. The desiccant wheel assembly of claim 24 wherein the static control device includes a grounding member, the grounding member being disposed between one of, the fore rim and the first wall, and the aft rim and the second wall.

26. The desiccant wheel assembly of claim 25 wherein the grounding member includes at least one ball bearing.

27. The desiccant wheel assembly of claim 1 wherein the static control device includes a grounding member.

28. The desiccant wheel assembly of claim 20 wherein the grounding member is made of steel.

29. The desiccant wheel assembly of claim 28 wherein the grounding member includes a brush member with metallic bristles.

30. The desiccant wheel assembly of claim 29 wherein:
the cabinet includes a plurality of walls defining a space for accommodating the desiccant wheel, the static control device being disposed within the space;
the plurality of walls includes a bottom wall and a pair of spaced apart, first and second walls extending upwardly from the bottom wall;
the desiccant wheel has an axis of rotation disposed longitudinally between the first and second walls;
the brush member is mounted to the bottom wall of the cabinet with its bristles extending upwardly toward the outer shell of the desiccant wheel, the bristles being positioned to brush against the outer shell during rotation of the desiccant wheel.

31. The desiccant wheel assembly of claim 27 wherein:
the cabinet includes a plurality of walls defining a space for accommodating the desiccant wheel, the static control device being disposed within the space;
the plurality of walls includes a bottom wall and a pair of spaced apart, first and second walls extending upwardly from the bottom wall;
the desiccant wheel has an axis of rotation disposed longitudinally between the first and second walls;
the grounding member includes a flap hingedly mounted to one of the plurality of walls of the cabinet, for engaging the outer shell of the desiccant wheel.

32. The desiccant wheel assembly of claim 31 wherein the flap is biased against the outer shell.

33. The desiccant wheel assembly of claim 1 wherein the desiccant wheel is supported on caster assemblies, at least a portion of the caster assemblies defining the static guard device.

34. The desiccant wheel assembly of claim 1 further comprising a central shaft connected to a ground, the desiccant wheel being axially mounted for rotation about the central shaft, and the static control device connecting the central shaft to the outer shell of the desiccant wheel.

35. The desiccant wheel assembly of claim 1 wherein the ground includes an electrical ground.

36. The desiccant wheel assembly of claim 1 wherein the cabinet is supported by a frame and the frame serves as the ground.

37. A system for dehumidifying air in an enclosed space comprising:
a desiccant wheel assembly having:
a cabinet;
a desiccant wheel rotatively mounted within the cabinet, the desiccant wheel having a core impregnated with a desiccant material and an electrically conductive outer shell surrounding the core, the core of the desiccant wheel having a process section and a reactivation section defined therein;
means for driving rotation of the desiccant wheel within the cabinet; and
a static control device connected to a ground and associated with the desiccant wheel for discouraging build-up of electrostatic charges on the desiccant wheel during rotation thereof;
first blower means for drawing a supply air stream from the enclosed space and urging the supply air stream to flow through the process section wherein moisture in the supply air stream is removed by the desiccant material;
an outlet located downstream of the process section for exhausting the dehumidified supply air stream into the enclosed space;
a reactivation system for heating a reactivation air stream;
second blower means for drawing the reactivation air stream from outside the enclosed space through the reactivation system and urging the reactivation air stream to flow through the reactivation section wherein moisture retained in the desiccant material is released into the reactivation air stream; and
a reactivation air outlet located downstream of the reactivation section for exhausting the reactivation air stream outside the enclosed space.

38. The system of claim 37 wherein the static control device is connected to the outer shell of the desiccant wheel.

39. The system of claim 38 wherein the static control device is fixed to one of the desiccant wheel and the cabinet.

40. The system of claim 37 further comprising a frame for supporting the cabinet, the frame serves as the ground.

41. The system of claim 37 wherein the driving rotation means includes a motor designed to be explosion-proof.

42. The system of claim 41 wherein the motor is selected from the group consisting of: (a) an electric motor; (b) a hydraulically-driven motor; and (c) a pneumatically-driven motor.

43. The system of claim 37 wherein each of the first and second blower means includes a suction blower driven by a motor designed to be explosion-proof.

44. The system of claim 43 wherein the motor is selected from the group consisting of: (a) an electric motor; (b) a hydraulically-driven motor; and (c) a pneumatically-driven motor.

45. The system of claim 37 wherein the reactivation system heats the reactivation air stream using a reactivation process selected from the group consisting of: (a) electrical reactivation; (b) steam reactivation; and (c) gas fired reactivation.

46. The system of claim 37 wherein the reactivation system includes at least one duct heater.

47. The system of claim 46 wherein the at least one duct heater is an electric duct heater.

48. A method for dehumidifying air in an enclosed space using a desiccant wheel dehumidification system, the method comprising:

providing a rotatable desiccant wheel having a core impregnated with a desiccant material and an electrically conductive outer shell surrounding the core, the core of the desiccant wheel having a process section and a reactivation section defined therein;

providing a static control device connected to a ground and associated with the desiccant wheel;

driving the desiccant wheel to rotate;

urging the static control device to contact the desiccant wheel to thereby discourage the build-up of electrostatic charges on the desiccant wheel during rotation thereof;

drawing a supply air stream from the enclosed space and urging the supply air stream to flow through the process section wherein moisture in the supply air stream is removed by the desiccant material in the core;

exhausting the thus dehumidified supply air stream into the enclosed space; and regenerating the desiccant material in the core.

49. The method of claim 48 wherein regenerating the desiccant material includes:

drawing a reactivation air stream from outside the enclosed space and urging it to flow through the reactivation section wherein moisture retained in the desiccant material is released into the reactivation air stream; and exhausting the reactivation air stream outside the enclosed space.

50. The method of claim 49 wherein drawing the reactivation air stream includes heating the reactivation air stream.

* * * * *